United States Patent
Watanabe et al.

(10) Patent No.: US 7,311,259 B2
(45) Date of Patent: Dec. 25, 2007

(54) BAR CODE READER AND METHOD OF READING OF BAR CODE

(75) Inventors: Mitsuo Watanabe, Tokyo (JP); Isao Iwaguchi, Tokyo (JP); Hideo Miyazawa, Tokyo (JP); Kozo Yamazaki, Tokyo (JP); Masanori Ohkawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 53 days.

(21) Appl. No.: 10/730,018

(22) Filed: Dec. 9, 2003

(65) Prior Publication Data

US 2004/0164163 A1 Aug. 26, 2004

(30) Foreign Application Priority Data

Feb. 21, 2003 (JP) ............... 2003-045081

(51) Int. Cl.
*G06K 7/10* (2006.01)
(52) U.S. Cl. .................... 235/462.14; 235/462.15; 235/462.45; 235/462.01; 235/462.02; 235/462.03
(58) Field of Classification Search ........... 235/462.14, 235/462.15, 462.45, 462.46, 462.49, 472.01–472.03
See application file for complete search history.

(56) References Cited

U.S. PATENT DOCUMENTS

| | | | | |
|---|---|---|---|---|
| 5,142,131 | A * | 8/1992 | Collins et al. | 235/462.46 |
| 5,663,552 | A * | 9/1997 | Komizo | 235/472.01 |
| 6,340,114 | B1 * | 1/2002 | Correa et al. | 235/462.22 |
| 6,478,225 | B1 * | 11/2002 | Swartz et al. | 235/462.22 |
| 6,581,835 | B1 * | 6/2003 | Lucera et al. | 235/462.01 |
| 6,651,890 | B2 * | 11/2003 | Byun et al. | 235/462.43 |
| 6,871,786 | B1 * | 3/2005 | Swartz | 235/472.01 |

FOREIGN PATENT DOCUMENTS

JP    2000-251008    9/2000

* cited by examiner

*Primary Examiner*—Steven S. Paik
(74) *Attorney, Agent, or Firm*—Kratz, Quintos & Hanson, LLP

(57) ABSTRACT

A bar code reader includes a first circuit board on which a photodiode, which receives light reflected from a bar code, is installed and a second circuit board on which a processing unit that processes a signal output from the photodiode. The position at which the first circuit board is placed can be decided irrespective of the position at which the second circuit board is placed. The first circuit board is placed at a position that is most suitable for receiving light reflected from the bar code.

18 Claims, 6 Drawing Sheets

BAR CODE READER AND METHOD OF READING OF BAR CODE

BACKGROUND OF THE INVENTION

1) Field of the Invention

The present invention relates to a bar code reader and, in particular, relates to a bar code reader that reads a bar code attached to a commodity.

2) Description of the Related Art

Products are managed by providing a bar code to the product and identifying the product by reading this bar code optically. Since the bar code labels can be prepared at a low cost by printing etc., by using such bar code labels, it is possible to reduce the management cost substantially.

The bar-code labels attached to the products are read using a bar code reader. Such a bar code reader generally includes an optical system like a laser reader, a charged coupled device (CCD) camera etc. The bar code reader receives light that is reflected from a bar code label, determines a pattern of the white lines and the black lines in the bar code from the optical power of the light reflected, and then decodes this pattern to obtain character data that is a pattern of numerals and characters. Such a bar code reader has been disclosed in, for example, Japanese Patent Application Laid-open Application No. 2000-251008.

The accuracy of reading of a bar code varies according to the position of receiving of the reflected light, i.e. the position of the photodiode. Thus, the position of the photodiode is an important factor that decides the accuracy.

Generally the conventional bar-code readers are equipped with a single circuit board and a photodiode that receives the light that is reflected from a bar-code label and an arithmetic unit that decodes the bar code are installed on this circuit board. When the photodiode is installed on the circuit board along with the arithmetic unit or other components, the positions where the photodiode can be installed are limited so that sometimes the photodiode cannot be installed in a suitable position that allows increased accuracy of reading. If the photodiode is not installed in the suitable position, there is a decline in the accuracy.

SUMMARY OF THE INVENTION

It is an object of the present invention to at least solve the problems in the conventional technology.

A bar-code reader according to one aspect of the present invention includes a first arrangement to mount a converting element that receives a light reflected from a bar code and converts the light received to an electric signal; and a second arrangement to mount a processing unit that reproduces the bar code from the electric signal.

A method of reading a bar code, according to another aspect of the present invention, use a bar code reader that includes a first processor that reproduces a pattern of the bar code from a electric signal, the first processor having a first memory unit; a second processor that reproduces the bar code based on the pattern, the second processor having a second memory unit; and a storage unit that stores a first computer program and a second computer program. The method includes the first processor reading the first computer program from the storage unit, storing the first computer program into the first memory unit, and executing the first computer program to reproduce the pattern; and the first processor reading the second computer program from the storage unit and storing the second computer program into the second memory unit of the second processor, and the second processor executing the second computer program to reproduce the bar code.

The other objects, features and advantages of the present invention are specifically set forth in or will become apparent from the following detailed descriptions of the invention when read in conjunction with the accompanying drawings.

DETAILED DESCRIPTION

Exemplary embodiments of a bar-code reader according to the present invention are explained in detail below with reference to the accompanying diagrams.

Figure 1:
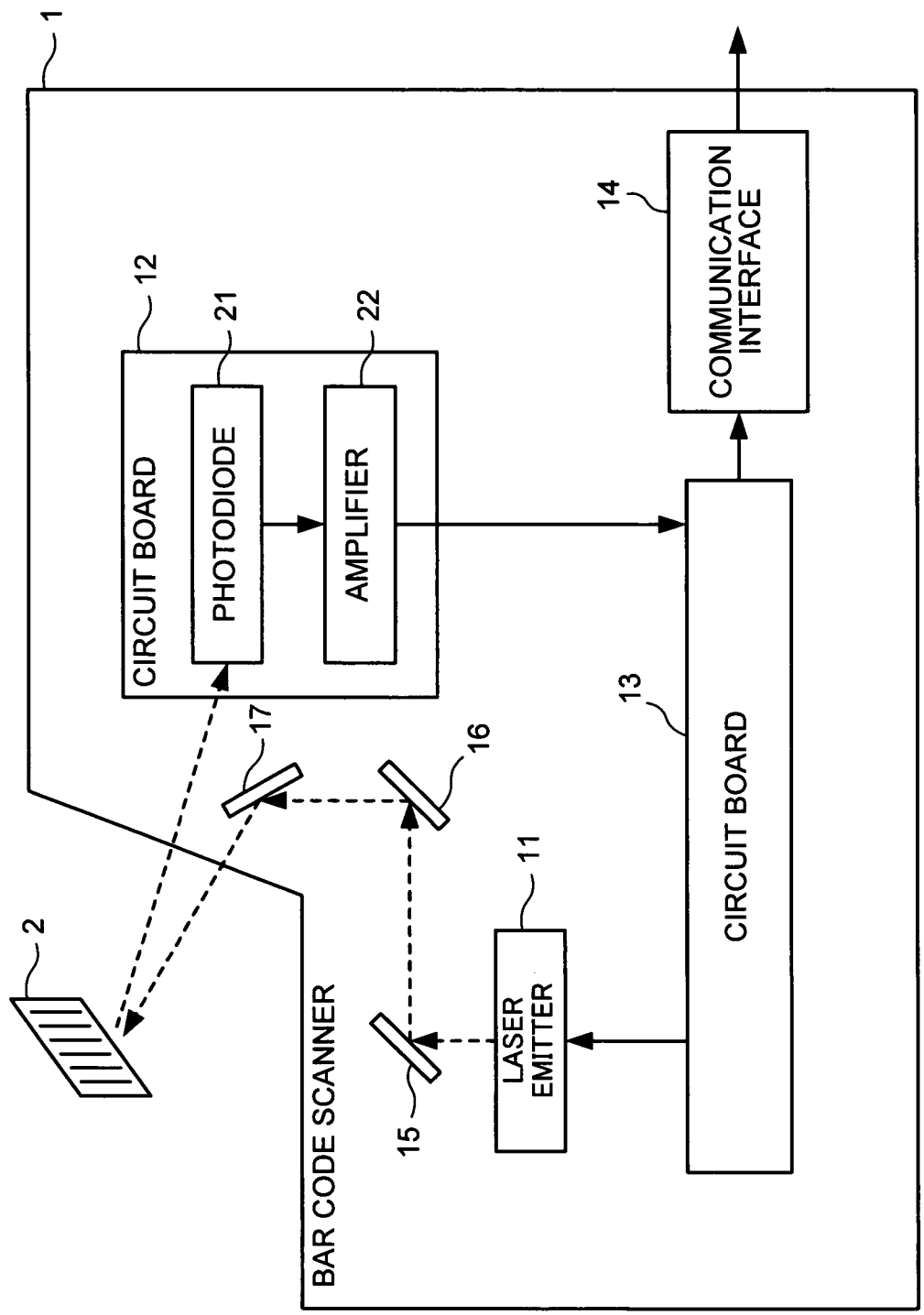
FIG. 1 is an illustration of a general configuration of a bar-code reader according to an embodiment of the present invention.

FIG. 1 is an illustration of a general configuration of a bar-code reader according to an embodiment of the present invention. A bar-code reader 1 includes a laser emitter 11, a circuit board 12, a circuit board 13, a communication interface 14, and mirrors 15, 16, and 17.

The laser emitter 11 emits laser beam in response to a control signal from the circuit board 13. This laser beam is irradiated on a bar code 2 via an optical system that is formed by the mirrors 15, 16, and 17.

The bar code 2 reflects the laser beam. The reflected light falls on a photodiode 21 that is installed on the circuit board 12. The photodiode 21 converts the light to an opto-electric signal and outputs the opto-electric signal. The optical power of the light reflected from the bar code varies depending on whether the laser beam has been reflected from a black line or a white line. Precisely, if the laser beam that is received by the photodiode 21 is the one that is reflected from a black line, the magnitude of the opto-electric signal that is output from the photodiode 21 is relatively low, and if the laser beam that is received by the photodiode 21 is the one that is reflected from a white line, the magnitude of the opto-electric signal that is output from the photodiode 21 is relatively high.

An amplifier 22 that is installed on the circuit board 12 amplifies the opto-electric signal and outputs a resultant amplified electric signal. The amplified electric signal is transmitted to the circuit board 13 via, for example, a twisted cable.

The circuit board 13 reproduces a pattern of black lines and white lines in the bar code 2 from the amplified electric signal, decodes the bar-code pattern to generate a character data, and transmits the character data to an external unit like a point-of-sales (POS) terminal via a communication interface 14. The character data includes a pattern of numerals and alphabets. The communication interface 14 may be any interface, like an RS 232 or a USB.

Thus, in the bar-code reader 1, the circuit board 13, which demodulates the bar-code and outputs the control signal to the laser emitter 11, is independent form the circuit board 12, which includes the photodiode 21 that receives the light from the bar code. As a result, the circuit board 12 can be placed at a desired position in the bar-code reader without bothering to the position of the circuit board 13. That is, the circuit board 12 can be placed at a position that is most suitable for receiving the laser light reflected form the bar code. This results in an increase in an accuracy of reading of the bar code.

Figure 2:
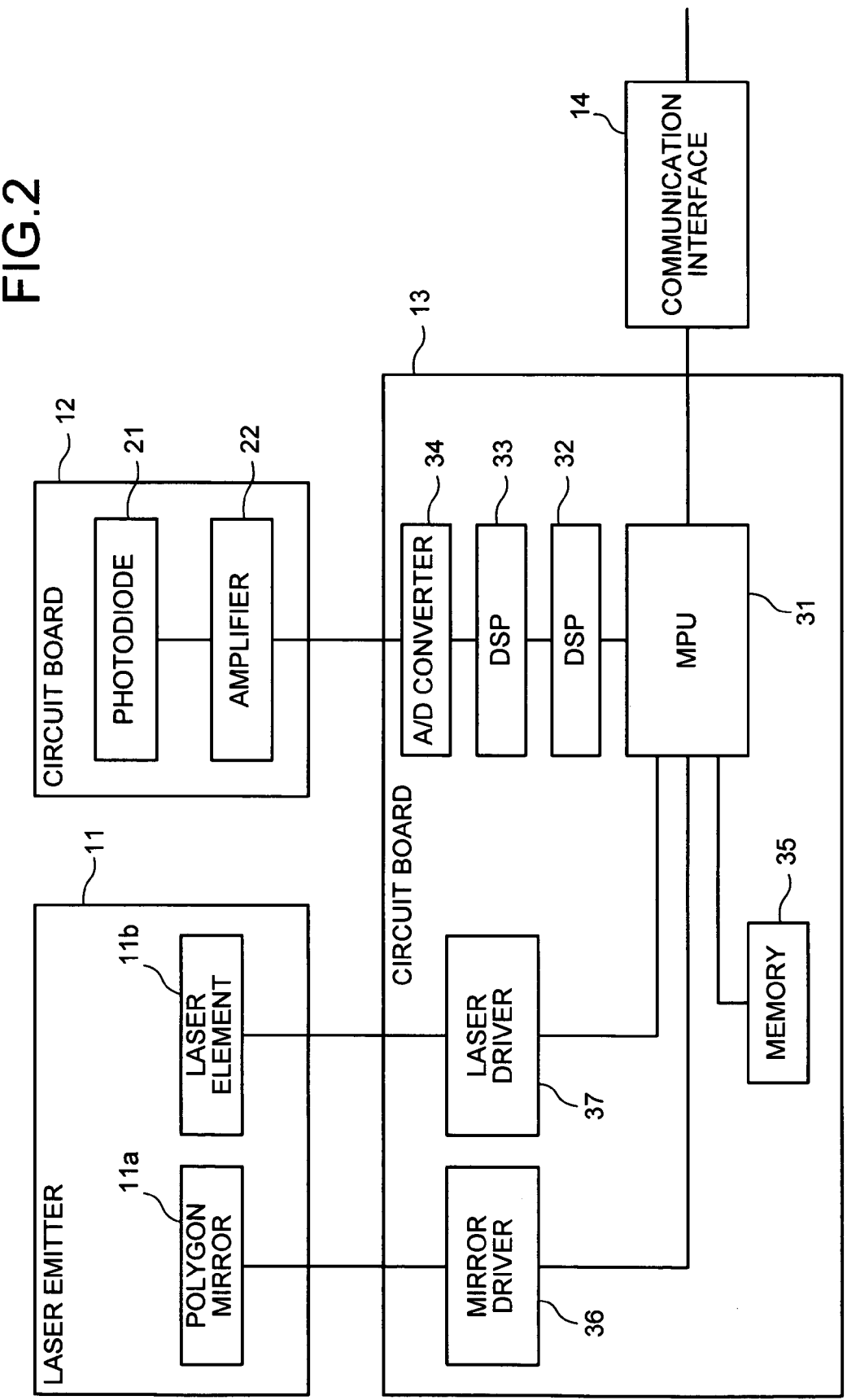
FIG. 2 is an illustration of a detailed configuration of the bar-code reader in FIG. 1.

FIG. 2 is an illustration of a detailed configuration of the bar-code reader 1. The laser emitter 11 includes a polygon mirror 11 and a laser element 11b. Moreover, the circuit board 13 includes an MPU 31, a DSP 32, a DSP 33, an analog-to-digital (A/D) converter 34, a memory 35, a mirror driver 36, and a laser driver 37.

The MPU 31 controls the bar-code reader 1. Concretely, the MPU 31 performs the operation control of the laser element 11b via the laser driver 37, the operation control of the polygon mirror 11a via the mirror driver 36, the decoding of bar-code, and communication with the POS terminal via the communication interface 14.

The laser driver 37, based on a control signal from the MPU 31, controls the laser element 11b so as to emit the laser beam. The mirror driver 36, based on a control signal from the MPU 31, rotates the polygon mirror 11a. The laser beam that is irradiated from the laser element 11b is irradiated on the polygon mirror 11a. The direction toward which the laser beam is to be reflected from the polygon mirror 11 is varied by rotating the polygon mirror 11, thereby realizing the scan of the bar code 2.

The photodiode 21, which is installed on the circuit board 12, receives the light reflected from the bar code 2, converts the light into an analog opto-electric signal (hereinafter, "analog signal"), and inputs the analog signal to the amplifier 22. The amplifier 22 amplifies the analog signal and supplies the amplified analog signal to the circuit board 13.

The A/D converter 34, which is installed on the circuit board 12, converts the amplified analog signal to a digital opto-electric signal (hereinafter, "digital signal"). The DSP 33 extracts edge information from this digital signal and inputs the edge information to the DSP 32. The DSP 32 reproduces a pattern of black lines and white lines of the bar code 2 (hereinafter, "bar-code pattern") from the edge information and inputs the bar-code pattern to the MPU 31. The MPU 31 converts the bar-code pattern to character data, which is a pattern of numerals and alphabets, and outputs the character data via the communication interface 14 to, for example, the POS terminal.

In other words, in the circuit board 13, the process of decoding of the bar code is distributed among the DSP 32, the DSP 33, and the MPU 31. By distributing the process of decoding in this manner, the load on the MPU 31 is reduced and the decoding can be performed speedily.

The memory 35 stores computer programs that are executed by the DSP 32, the DSP 33, and the MPU 31. The MPU 31, at the start-up of the bar-code reader 1, reads a necessary computer program from the memory 35 and stores that computer program in a random access memory (RAM) in the MPU 31. The MPU 31, at the start-up of the bar-code reader 1, also reads necessary computer programs that are executed by the DSP 32 and the DSP 33 from the memory 35 and stores those computer programs in a RAM in the DSP 32 and a RAM in the DSP 33.

In other words, in the circuit board 13, the MPU 31 carries out the management of the computer programs that are used by the DSP 32 and DSP 33.

Figure 3:
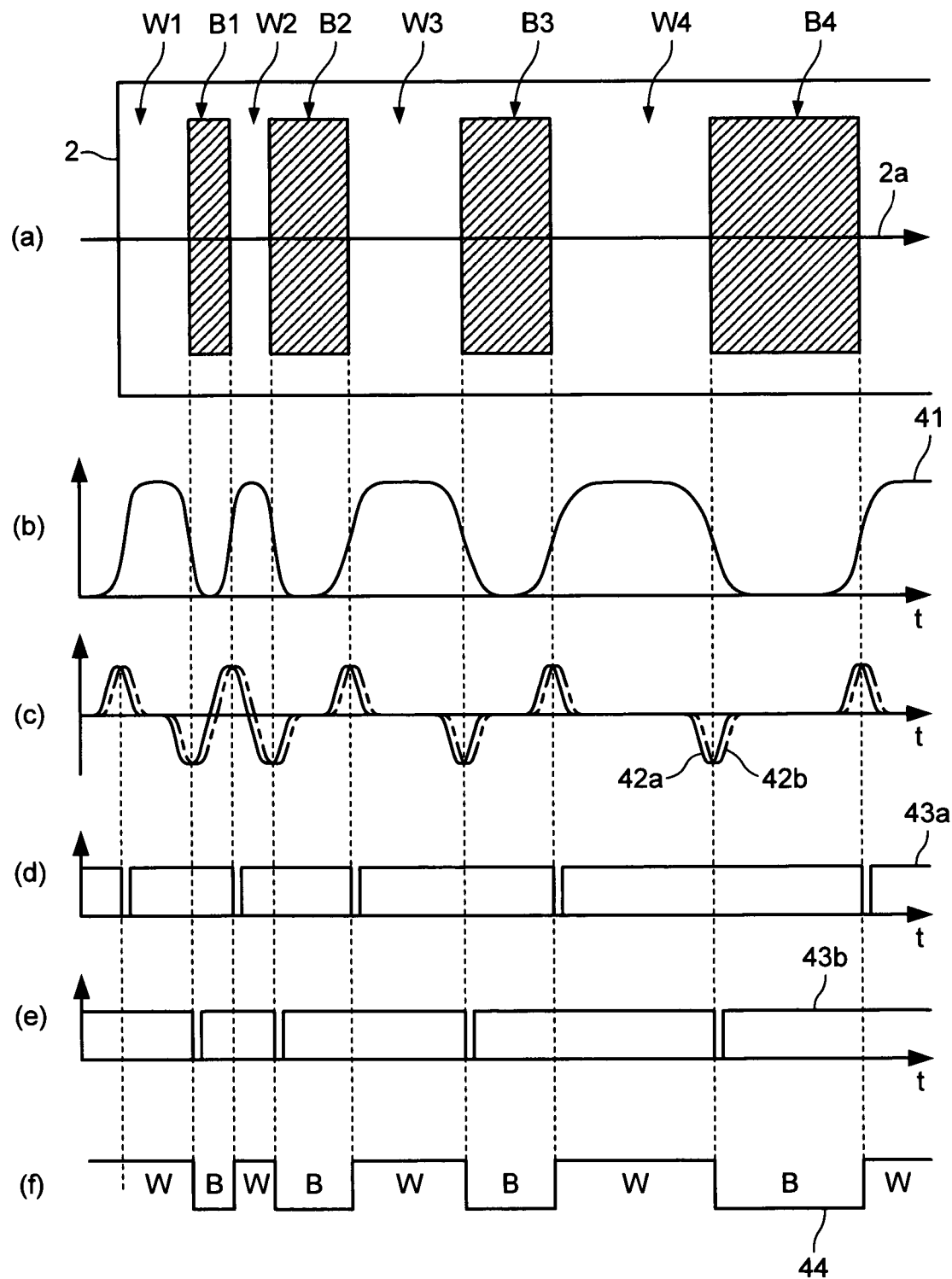
FIG. 3 is an illustration of processing by the bar-code reader in FIG. 1.

The processing by the bar-code reader 1 is explained while referring to FIG. 3. Part (a) in FIG. 3 represents an exemplary pattern of black lines and white lines in the bar code 2. The bar code 2 includes white lines W1 to W4 and black lines B1 to B4 arranged alternately. Widths of the lines W1 to W4 and B1 to B4 depend on the information represented by the bar code. As the bar code is scanned along the direction 2a, the optical power of the light reflected from the bar code varies depending on the width of the lines.

Part (b) in FIG. 3 represents an analog signal 41 output from the photodiode 21. When the laser beam that is received at the photodiode 21 is the one that is reflected from any of the white lines W1 to W4, a comparatively stronger analog signal is output from the photodiode 21 than when the laser beam is the one that is reflected from the black lines B1 to B4. The A/D converter converts the analog signal to digital signal and supplies the digital signal to the DSP 33.

The DSP 33 extracts edge information from the digital signal and outputs the edge information (see part (c) in FIG. 3) to the DSP 32. Edge information 42a is a differential of the digital signal. Therefore, the edge information is positive when the digital signal has a trend toward increase, and the edge information is negative when the digital signal has a trend toward decrease. In other words, the edge information 42a is positive at a boundary between the black line and the subsequent white line and negative at a boundary between the white line and the subsequent black line. Moreover, the DSP 33 delays the edge information 42a to prepares edge information 42b. The edge informations 42a and 42b are supplied to the DSP 32.

The DSP 32 reproduces, from the edge information 42a and the 42b, the pattern in bar code. Concretely, the DSP 32 determines point of intersections of all the edge information 42a and 42b to thereby determine boundaries between the black lines and the white lines. Part (d) in FIG. 3 (signal 43a) depicts the boundaries between the black lines and the subsequent white lines and part (e) in FIG. 3 (signal 43b) depicts the boundaries between the white lines and the subsequent white lines.

The DSP 32 reproduces, from the signals 43a and 43b, the bar-code pattern as bar-code data 44 (see part (f) in FIG. 3). The bar-code data 44, is supplied to the MPU 31. The MPU 31 converts the bar-code data 44 to character data.

Thus, the DSP 32 and the DSP 33 perform processing up to reproducing of the bar-code pattern from the digital signal. The MPU 31 performs only the conversion of the bar-code data to the character data. In this manner, the processing load on the MPU 31 is reduced.

Although it is mentioned here that the processing up to reproducing of the bar-code pattern from the digital signal is performed by two processors, the DSPs 32 and 33, there is no particular restriction on the number of DSPs.

Although it is mentioned here that the conversion of the bar-code data to the character data is performed by one processor, the MPU 31, there is no particular restriction on the number of MPUs.

Although it is mentioned here that the processing up to reproducing of the bar-code pattern from the digital signal is performed by two processors, the DSPs 32 and 33, and the conversion of the bar-code data to the character data is performed by one processor, the MPU 31, there is no particular restriction on how the entire processing is divided.

Figure 4:
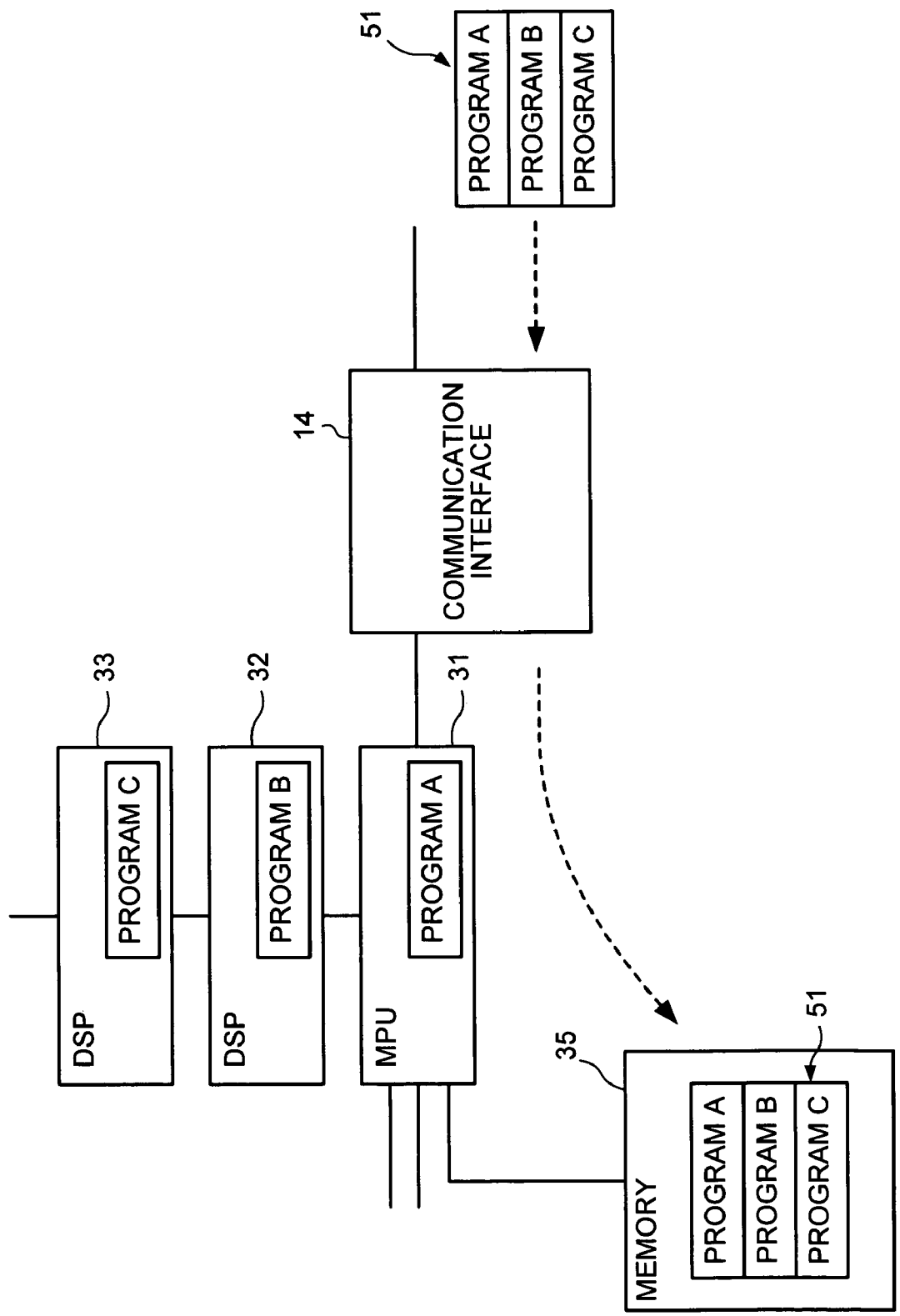
FIG. 4 is an illustration of how the computer programs that are executed by a digital signal processor (DSP) and a micro processing unit (MPU) of the bar-code reader are managed.

Next, the management and updating of processing program in the bar-code reader is explained below. As is shown in FIG. 4, a program A that is executed by the MPU 31, a computer program B that is executed by the DSP 32, and a computer program C that is executed by the DSP 33 are all stored in the memory 35. The memory 35 may be a flash read only memory (ROM). The memory 35 is such that the computer programs A, B, and C are not erased even after power supply to the bar code reader 1, i.e., the memory 35, shut down.

The MPU 31, at the time of start-up of the bar-code reader 1, reads the computer program A from the memory 35 and stores the computer program A in the RAM in the MPU 31. Next, the MPU 31 reads the computer program B and writes the computer program B in the RAM in the DSP 32 and then reads the computer program C and writes the computer program C in the RAM in the DSP 33.

When there is a change in the set 51 of the computer programs A, B and C, the MPU 31 receives the new set 51 via the communication interface 14 and writes the new set 51 over the existing set in the memory 35.

It is common to update the computer programs when a bug is found, or when there is a version up of a firmware. The new set 51 need not necessarily include all of the computer programs A to C. In other words, the new set may include only a computer program that is to be updated.

Thus, the MPU 31 collectively manages even the computer programs B and C that are used by the DSP 32 and the DSP 33. As a result, the computer programs can be managed efficiently. For example, if there is a need to update a computer program that is used by a plurality of processors, since the MPU 31 realizes the update, that computer program needs to be downloaded only once. As a result, the updating becomes simpler as well as there is a reduction in the volume of communication.

FIGS. 1 and 2 illustrate a case in which the bar-code reader includes only one photodiode. However, there may be a plurality of photodiodes that are arranged different positions so as to receive the light reflected from one bar code. This arrangement enables to read the bar code with high accuracy.

Figure 5:
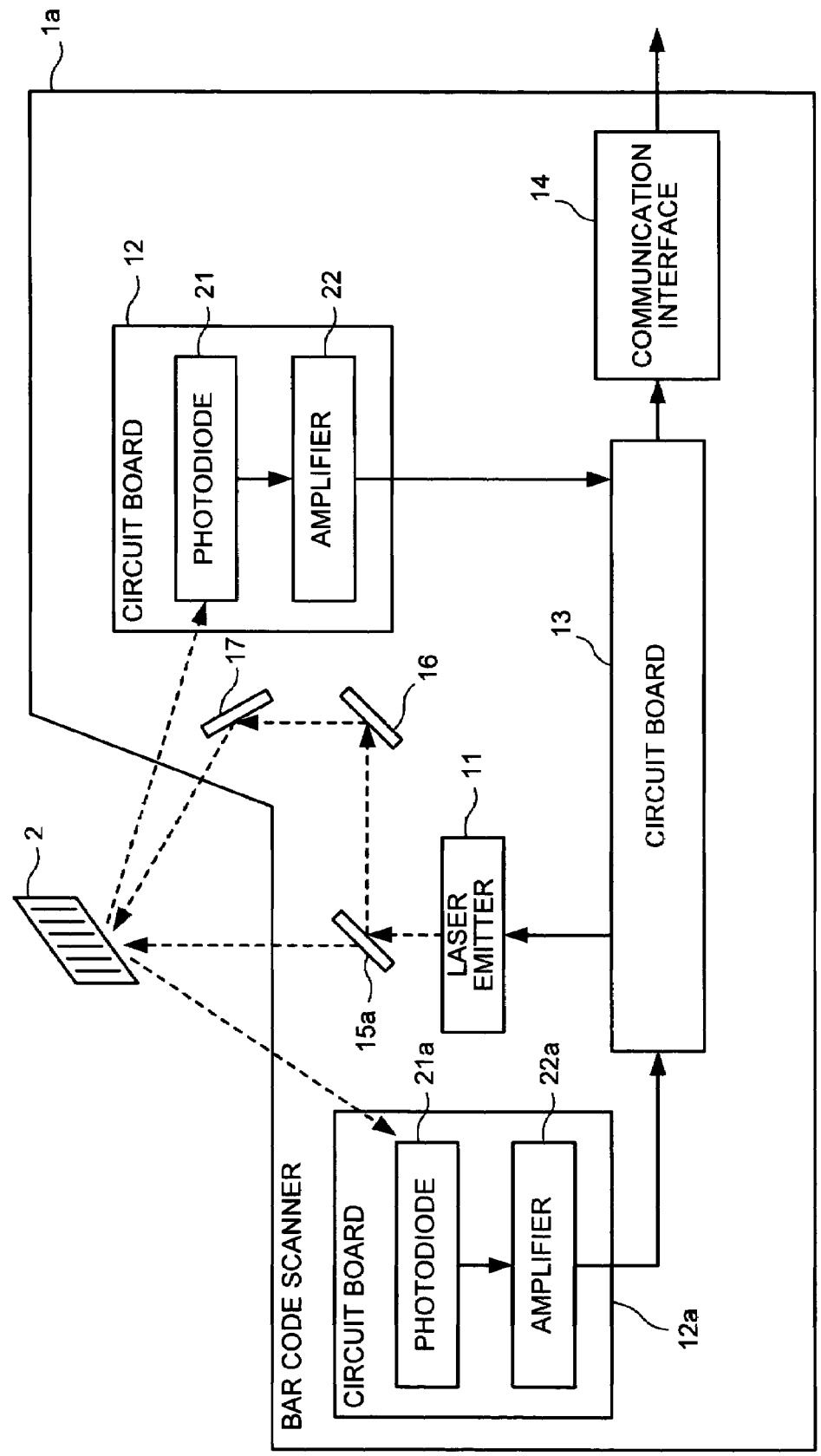
FIG. 5 is an illustration of a general configuration of a bar-code reader according to another embodiment of the present invention.

FIG. 5 is an illustration of a bar-code reader that has two photodiodes. A bar-code reader 1a includes a circuit board 12a in addition to the circuit board 12. The circuit board 12a has similar configuration as the circuit board 12 and includes a photodiode 21a and an amplifier 22a.

Moreover, the bar-code reader 1a includes a mirror 15a, which is a half mirror, instead of the mirror 15, which is an ordinary mirror. The mirror 15a splits a laser beam that is emitted from the laser emitter 11 into two beams. One of those beams is irradiated on the bar code 2 via the mirrors 16 and 17 and the other of those beams is irradiated directly on the bar code 2. Thus, laser beams are irradiated on the bar code from two directions.

The circuit board 12 functions in the same manner as that explained in relation to the FIGS. 1 and 2. In other words, the circuit board 12 supplies an amplified signal to the circuit board 13.

The circuit board 12a includes the photodiode 21a and an amplifier 22a. The photodiode 21a converts the light reflected from the bar code into analog opto-electric signal and then the amplifier 22a amplifies the analog signal. The amplified signal is supplied to the circuit board 13.

The circuit board 13 process the analog signals received from the circuit boards 12 and 12a, to thereby obtain a bar code pattern, and outputs the bar code pattern to, for example, the POS terminal, via the communication interface 14.

Figure 6:
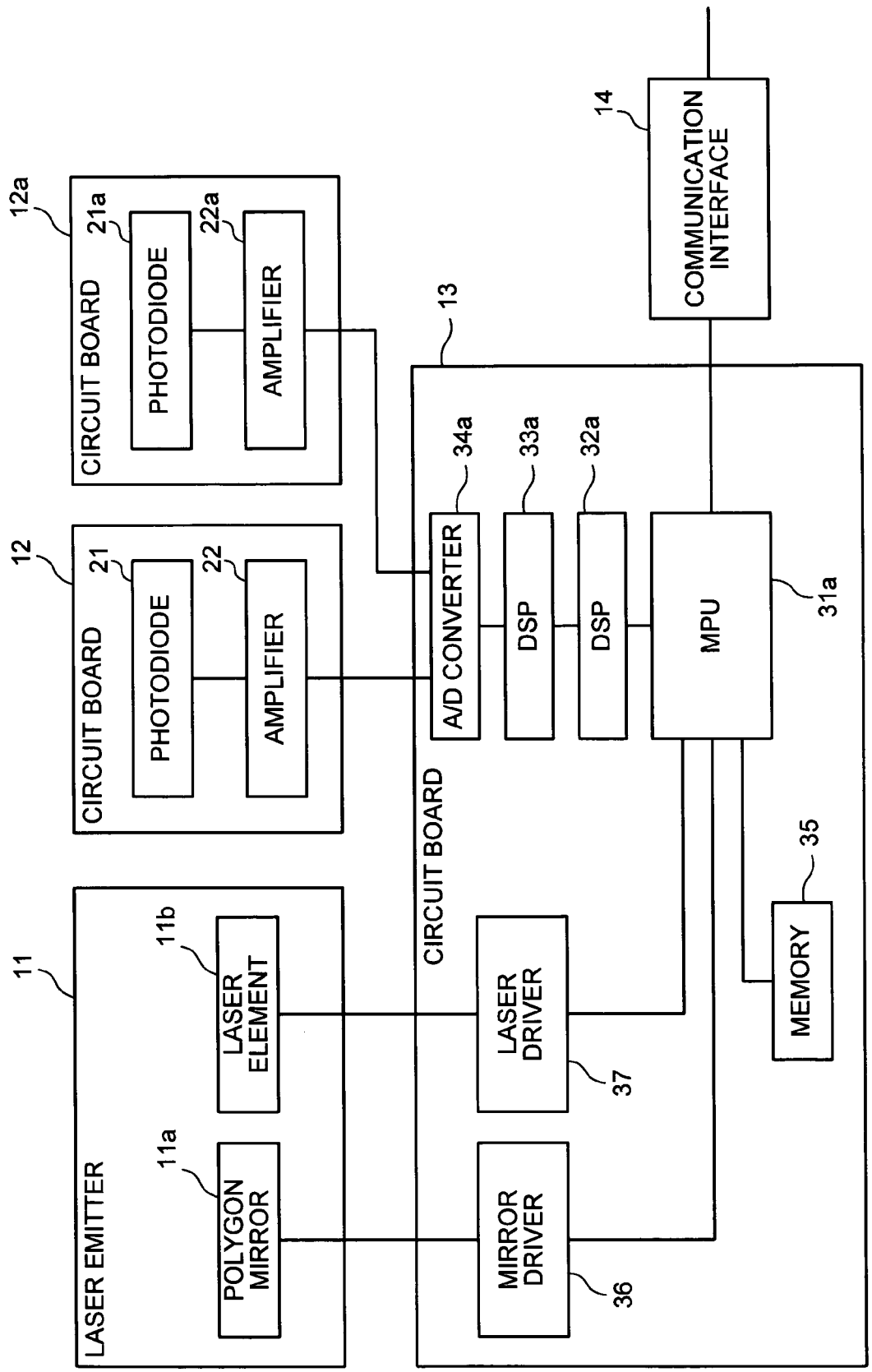
FIG. 6 is an illustration of a detailed configuration of the bar code reader in FIG. 5.

FIG. 6 is an illustration of a detailed configuration of the bar code reader 1a. An A/D converter 34a receives the amplified signals from the circuit boards 12 and 12a, converts the amplified signals into digital signals, and supplies the digital signals to the DSP 33. The DSP 33a extracts edge information from each digital signal and transmits the edge information to the DSP 32a. The DSP 32a reproduces a bar-code pattern from each of the edge information, and supplies the two bar-code patterns to the MPU 31a. The memory 35 has the same configuration as explained in relation to FIGS. 1 and 2.

The MPU 31a converts the bar-code patters into respective character data and determines which of the two character data is more accurate. The MPU 31a supplies the character data that is accurate to the POS terminal via the communication interface 14. Any known method may be used to determine which of the two character data is more accurate.

As character data that is more accurate is used, in the accuracy of reading of the bar-code is enhanced. The circuit boards 12a and 13 may be placed at suitable positions without bothering the position of the circuit board 13.

FIGS. 5 and 6 depict a case in which the digital signal is first converted to the character data and the character data that is more accurate is determined subsequently. However, the digital signal that is more accurate may be determined first and the digital signal that is accurate may only be converted to the character data. Moreover, the DSP 32a or the DSP 33a may be allowed to use any one of the edge information or the digital signal or may be allowed to make a judgment of which signal is to be processed, depending on the state of the analog signal before inputting to the A/D converter 34a.

As a circuit board, on which a photodiode installed, can be placed at a position that is optimum for receiving the light reflected from the bar code, the accuracy of reading of the bar-code can be enhanced with a simple configuration.

Moreover, as a plurality of circuit boards, each mounting a photodiode, can be placed at a position that is optimum for receiving the light reflected from the bar code, the accuracy of reading of the bar-code can be improved further.

As the processing for decoding of the bar code is distributed among a plurality of processors, the load a processor that controls the bar-code reader can be reduced. In other words, the processing for decoding of the bar code can be performed speedily.

As the computer programs that are executed by the processors are managed by the processor that controls the bar-code reader, the computer programs can be managed efficiently. Moreover, the communication traffic between the bar-code reader and an external device can be reduced.

Thus, the present invention provides a bar-code reader that is fast, accurate, efficient, and has a simple configuration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
   a first circuit board having a photodiode connected to an amplifier which is connected to an A/D converter which receive light reflected from a bar code and convert the light received to an electric digital signal; and a second circuit board having a processing unit, a first digital signal processor (DSP) and a second DSP are connected to the processing unit, in which the processing unit receives the electrical digital signal and converts the electrical digital signal to character data representing the bar code and transmits the character data to a POS terminal, wherein the first circuit board is separate and distinct from the second circuit board and the first circuit board is positioned in the bar code reader so as to optimize the reception of light reflected from the bar code, wherein the position of the first circuit board is placed in the bar code reader irrespective of the position of the second circuit board, wherein the first DSP extracts edge information from this digital signal and inputs the edge information to the second DSP which reproduces a pattern of black lines and white lines of the bar code.

2. The bar-code reader according to claim 1, wherein the processing unit includes a first processor that reproduces a pattern of the bar code from the electric signal; and a second processor that reproduces the bar code based on the pattern.

3. The bar-code reader according to claim 2, wherein the first processor performs reproduction of the pattern and the second processor performs reproduction of the bar-code by executing computer programs, and the bar-code reader further comprises a storage unit that stores the computer programs.

4. The bar-code reader according to claim 3, wherein one of the first processor and the second processor functions as a managing processor and manages the computer programs in the storage unit.

5. The bar-code reader according to claim 4, wherein each one of the first processor and the second processor includes a memory unit, and when executing a computer program that is stored in the storage unit, the managing processor reads a corresponding computer program from the storage unit and writes the computer program read into the memory unit of a processor that is to execute the computer program.

6. The bar-code reader according to claim 3, further comprising a communicating unit that receives new computer program or an updated version of the computer program stored in the storage unit from an external unit, and writes the new computer program or overwrites the updated version on a corresponding computer program in the storage unit.

7. The bar-code reader according to claim 6, wherein the communicating unit transmits the bar code reproduced to the external unit.

8. The bar-code reader according to claim 1, wherein the processing unit includes;
  a first processor that extracts edge information from the digital signal;
  a second processor that reproduces a pattern of the bar-code from the edge information; and
  a third processor that reproduces the bar-code from the pattern.

9. The bar-code reader according to claim 8, wherein the first processor performs extraction of the edge information, the second processor performs reproduction of the pattern, and the third processor performs reproduction of the bar-code by executing computer programs, and the bar-code reader further comprises a storage unit that stores the computer programs.

10. The bar-code reader according to claim 9, wherein one of the first processor, the second processor, and the third processor functions as a managing processor and manages the computer programs in the storage unit.

11. The bar-code reader according to claim 10, wherein each one of the first processor, the second processor, and the third processor includes a memory unit, and when executing a computer program that is stored in the storage unit, the managing processor reads a corresponding computer program from the storage unit and writes the computer program read into the memory unit of a processor that is to execute the computer program.

12. The bar-code reader according to claim 9, further comprising a communicating unit that receives new computer program or an updated version of the computer program stored in the storage unit from an external unit, and writes the new computer program or overwrites the updated version on a corresponding computer program in the storage unit.

13. The bar-code reader according to claim 12, wherein the communicating unit transmits the bar code reproduced to the external unit.

14. The bar-code reader according to claim 1, further comprising a third circuit board having a converting element that receives a light reflected from the bar code and converts the light received to a third electric signal, wherein the processing unit mounted on the second circuit board also reproduces the bar code from the third electric signal.

15. The bar-code reader according to claim 14, wherein the processing unit decides, based on certain conditions, which of the bar codes out of the one that is reproduced from the electric signal and that is reproduced from the third electric signal is accurate.

16. A method of reading a bar code using a bar code reader that includes a photodiode which receives light reflected from a bar code, a first processor that reproduces a pattern of the bar code from a electric signal, the first processor having a first memory unit; a second processor tat reproduces the bar code based on the pattern, the second processor having a second memory unit; and a storage unit that stores a first computer program and a second computer program, comprising:
  the second processor reading the first computer program from the storage unit, storing the first computer program into the first memory unit, and the first processor executing the first computer program to reproduce the pattern by extracting edge information from the electric signal; and
  the second processor reading the second computer program from the storage unit and storing the second computer program into the second memory unit, and the second processor executing the second computer program to reproduce the bar code,
  wherein the photodiode connected to an amplifier which is connected to an A/D converter are located on a first circuit board containing the first processor, the second processor and storage unit are located on a second circuit board in which the first circuit board is separate and distinct from the second circuit board and the first circuit board is positioned in the bar code reader so as to optimize the reception of light reflected from the bar code,
  wherein the first circuit board is placed in the bar code reader irrespective of the position of the second circuit board includes the first processor connected to the A/D converter and the second processor connected to the first processor.

17. The method according to claim 16, further comprising:
the second processor receiving an updated version of the first computer program or the second computer program or both from outside; and
the second processor overwriting the updated version on a corresponding computer program in the storage unit.

18. The method according to claim 17, further comprising the second processor transmitting the bar code reproduced to the outside.

* * * * *